(12) United States Patent
Hospodor et al.

(10) Patent No.: US 6,697,914 B1
(45) Date of Patent: Feb. 24, 2004

(54) SWITCHED NODE COMPRISING A DISK CONTROLLER WITH INTEGRATED MULTI-PORT SWITCHING CIRCUITRY

(75) Inventors: Andrew D. Hospodor, Los Gatos, CA (US); Christopher L. Hamlin, Los Gatos, CA (US)

(73) Assignee: Western Digital Ventures, Inc., Lake Forest, CA (US)

( * ) Notice: Subject to any disclaimer, the term of this patent is extended or adjusted under 35 U.S.C. 154(b) by 515 days.

(21) Appl. No.: 09/660,002

(22) Filed: Sep. 11, 2000

(51) Int. Cl.[7] .............................................. G06F 12/00
(52) U.S. Cl. ...................................................... 711/112
(58) Field of Search ................................ 711/111, 149, 711/112, 4; 710/316–317; 370/254, 255

(56) References Cited

U.S. PATENT DOCUMENTS

| | | | |
|---|---|---|---|
| 5,157,654 A | | 10/1992 | Cisneros |
| 5,291,482 A | | 3/1994 | McHarg et al. |
| 5,297,262 A | | 3/1994 | Cox et al. |
| 5,521,928 A | | 5/1996 | Worsley et al. |
| 5,566,169 A | | 10/1996 | Rangen et al. |
| 5,612,897 A | * | 3/1997 | Rege ........................... 709/219 |
| 6,009,549 A | * | 12/1999 | Bliss et al. .................. 714/769 |
| 6,603,625 B1 | * | 8/2003 | Hospodor et al. ....... 360/73.02 |

OTHER PUBLICATIONS

"Hybrid Switch for a Highly Parallel System". IBM Technical Disclosure Bulletin. vol. 33, Issue No. 1A. Jun., 1990. pp. 214–217.*

Aaron Brown, "The UC Berkeley ISTORE Project: Bringing Availability, Maintainability, and Evolutionary Growth to Storage–Based Clusters", http://iram.CS.Berkeley.EDU/istore/talks/lucent–jan00/sld001.htm, Jan. 19, 2000.

* cited by examiner

*Primary Examiner*—Donald Sparks
*Assistant Examiner*—Kathy Takeguchi
(74) *Attorney, Agent, or Firm*—Milad G. Shara, Esq.; Howard H. Sheerin, Esq.

(57) ABSTRACT

A switched node is disclosed for use in a switched fabric network. The switched node comprises a disk and a head actuated over the disk. An integrated disk controller within the switched node comprises more than two bi-directional ports for simultaneously transmitting data in multiple directions through the switched fabric network, each port comprising an input port and an output port. The disk controller circuitry further comprises interface circuitry for interfacing with the head, a data buffer for storing data received from the input ports and data received from the head via the interface circuitry, and routing circuitry responsive to header data received from the input ports and header data received from the interface circuitry.

10 Claims, 6 Drawing Sheets

SWITCHED NODE COMPRISING A DISK CONTROLLER WITH INTEGRATED MULTI-PORT SWITCHING CIRCUITRY

BACKGROUND OF THE INVENTION

1. Field of the Invention

The present invention relates to multi-dimensional computer networks. More particularly, the present invention relates to a switched node comprising a disk controller with integrated multi-port switching circuitry.

2. Description of the Prior Art

A switched fabric is a multi-dimensional computer network wherein each node in the network comprises multiple ports for routing data in multiple dimensions (e.g., x and y). The bandwidth of switched fabric networks increases as new nodes are added which is a significant advantage over conventional single-dimensional networks. Rather than arbitrate for a single communication medium, data is routed in multiple dimensions which alleviates arbitration and blocking within the network.

Figure 1:
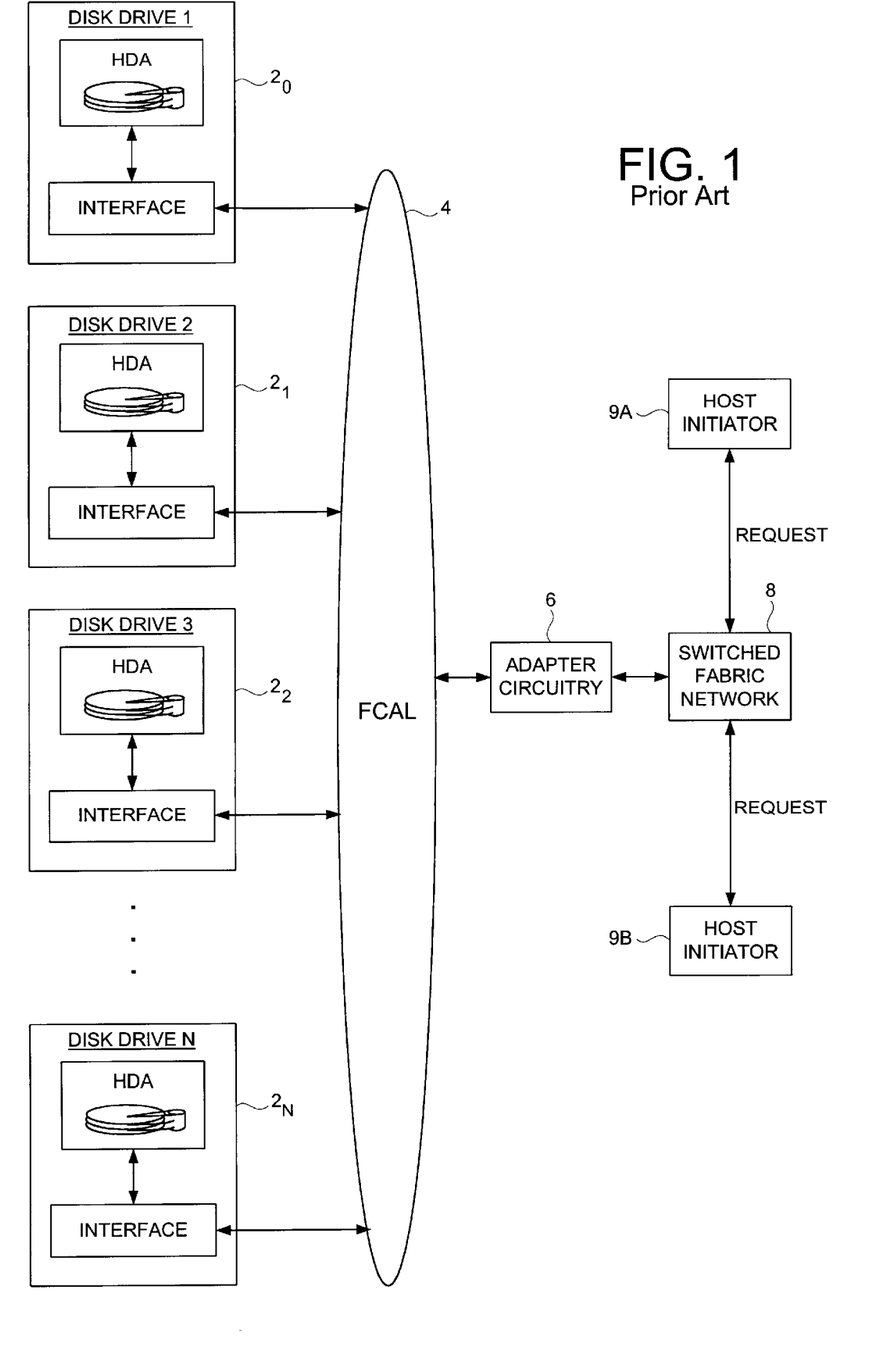
FIG. 1 shows a prior art network storage subsystem comprising a plurality of disk drives connected by a fibre channel arbitrated loop (FCAL) and adapter circuitry for connecting the FCAL to the edge of a switched fabric via a network switch.

Storage for switched fabric networks has in the past been implemented by attaching a storage subsystem to the edge of the fabric. One example illustrated in FIG. 1 is a fibre channel arbitrated loop (FCAL) which comprises a number of disk drives $2_0$–$2_N$ communicating over a shared transmission medium 4 which attaches to the edge of the switched fabric network 8 through appropriate adapter circuitry 6. Host initiators 9A and 9B send storage access requests through the switched fabric network 8, which are serviced via the adapter circuitry 6. This implementation provides limited performance since the access requests must be serviced one at a time due to the single-dimensionality of the shared communication medium 4 (i.e., the arbitrated loop).

The project "ISTORE" at the University of California, Berkeley proposes to attach a disk drive at the periphery nodes of a conventional crossbar switch to achieve a non-blocking, parallel access network storage system. However, the ISTORE project proposes to attach a conventional disk drive at each periphery node of the crossbar switch through multi-port switching circuitry implemented external to the disk drive. This requires adapter circuitry within the switching circuitry for converting network formatted data (typically network packets) into a format compatible with the interface protocol for the disk drive (e.g., the ATA protocol). That is, the adapter circuitry must first convert the network-formatted data into logical block addresses compatible with the disk drive interface protocol. A disk controller within the disk drive then converts the logical block addresses into physical block addresses which correspond to physical storage locations (typically sectors) on the disk. This increases the expense and access latency of the network storage system due to the adapter circuitry in each periphery node of the crossbar switch. Further, the ISTORE architecture suggests a predetermined, static topology for the network as determined by the crossbar switch implemented external to the disk drive.

There is, therefore, a need to reduce the cost and access latency of a network storage system. Further, there is a need to dynamically configure a network into a selected topology, as well as for the network to self-discover its topology once configured.

SUMMARY OF THE INVENTION

The present invention may be regarded as a switched node for use in a switched fabric network. The switched node comprises a disk and a head actuated over the disk. An integrated disk controller within the switched node comprises more than two bi-directional ports for simultaneously transmitting data in multiple directions through the switched fabric network, each port comprising an input port and an output port. The disk controller further comprises interface circuitry for interfacing with the head, a data buffer for storing data received from the input ports and data received from the head via the interface circuitry, and routing circuitry responsive to header data received from the input ports and header data received from the interface circuitry.

In one embodiment, the interface circuitry processes data received from the data buffer in order to store the data on the disk without mapping logical block addresses into physical block addresses. This avoids the overhead and cost of the prior art adapter circuitry which converts network data into a conventional disk drive interface protocol.

In another embodiment, the bi-directional ports in the switched node are dynamically configurable to connect to bi-directional ports of other switched nodes. And in yet another embodiment, the switched node comprises a self-discovery facility for use in discovering the topology of the switched fabric network.

The present invention may also be regarded as a switched fabric network comprising a plurality of interconnected switched nodes. Each switched node comprises a disk and a head actuated over the disk. An integrated disk controller within each switched node comprises more than two bi-directional ports for simultaneously transmitting data in multiple directions through the switched fabric network, each port comprising an input port and an output port. Each switched node further comprises interface circuitry for interfacing with the head, a data buffer for storing data received from the input ports and data received from the head via the interface circuitry, and routing circuitry responsive to header data received from the input ports and header data received from the interface circuitry.

DESCRIPTION OF THE PREFERRED EMBODIMENTS

Figure 5:
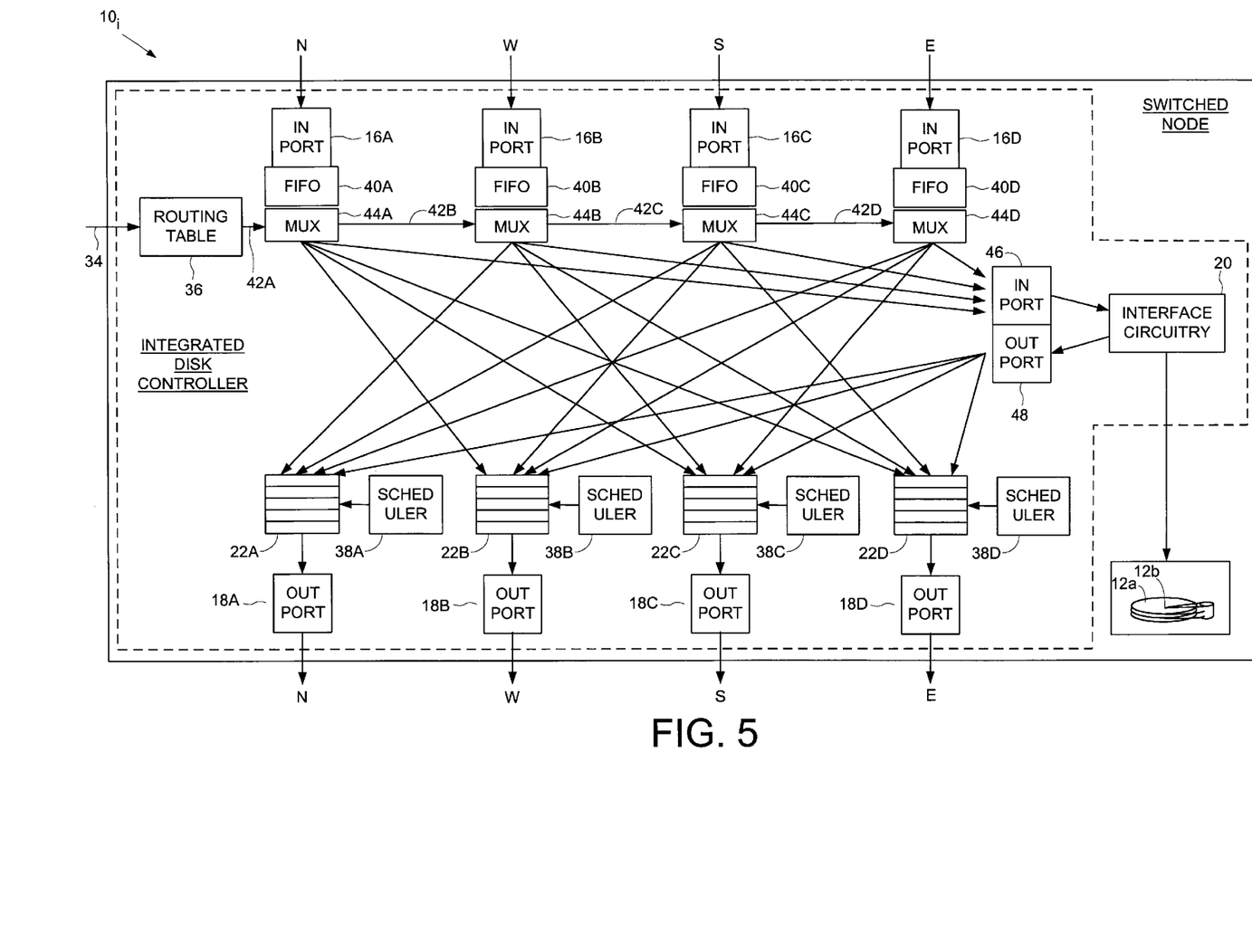
FIG. 5 shows details of a switched node according to an embodiment of the present invention as comprising an integrated disk controller comprising more than two bi-directional ports for simultaneously transmitting data in multiple directions through the switched fabric network, each port comprising an input port and an output port. The integrated disk controller further comprises interface circuitry for interfacing with a head actuated over a disk, a data buffer for storing data received from the input ports and data received from the head via the interface circuitry, and routing circuitry responsive to header data received from the input ports and header data received from the interface circuitry.

FIG. 5 shows a switched node $10_i$ for use in a switched fabric computer network according to an embodiment of the present invention. The switched node $10_i$ comprises a disk 12a and a head 12b actuated over the disk 12a. An integrated disk controller 14 within the switched node 10 comprises more than two bi-directional ports for simultaneously transmitting data in multiple directions through the switched fabric network, each port comprising an input port 16A–16D and an output port 18A–18D. The integrated disk controller further comprises interface circuitry 20 for interfacing with the head 12b, a data buffer 22A–22D for storing data received from the input ports 16A–16D and data received from the head 12b via the interface circuitry 20, and routing circuitry responsive to header data received from the input ports 16A–16D and header data received from the interface circuitry 20.

Figures 2, 3:
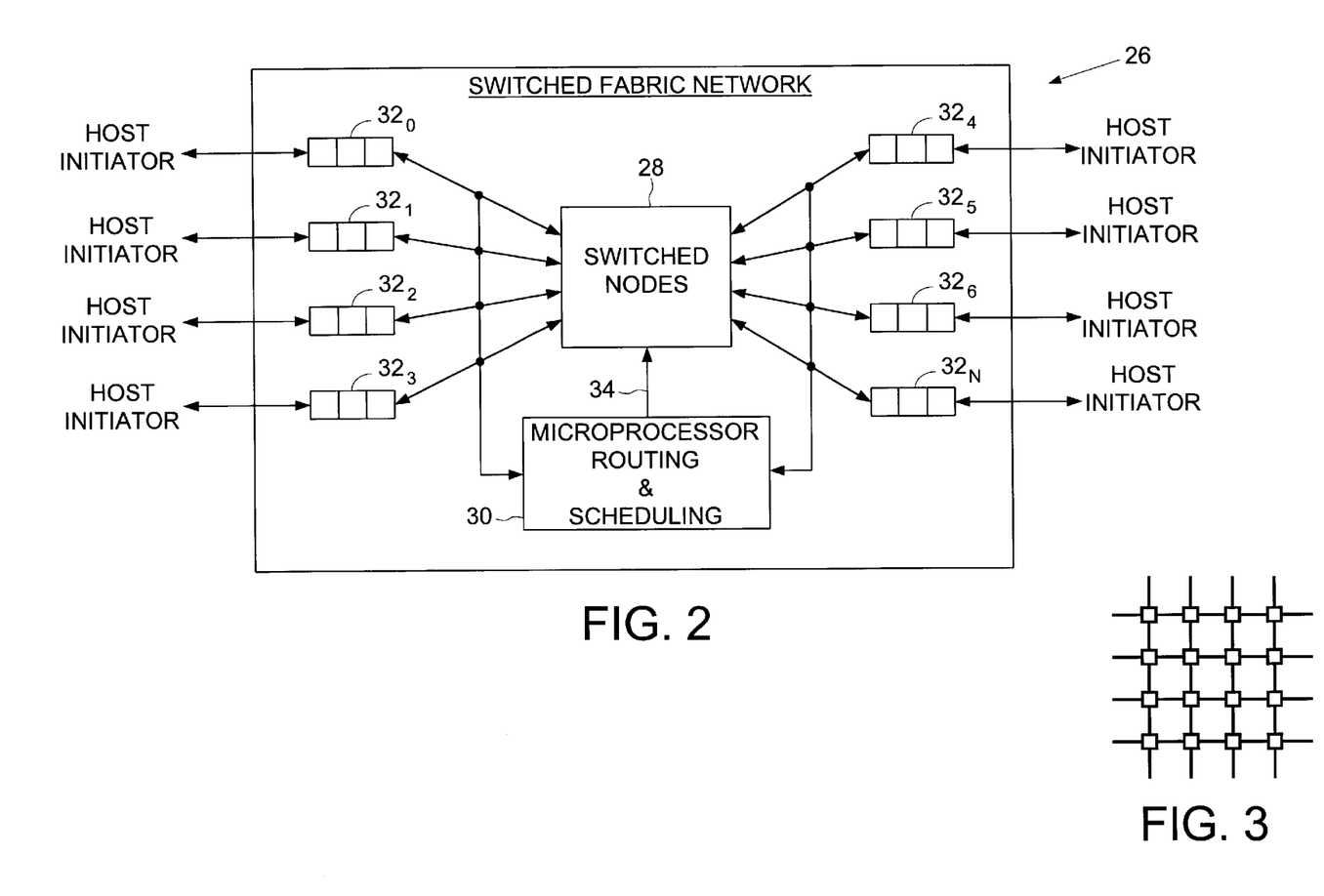
FIG. 2 shows a switched fabric network according to an embodiment of the present invention as comprising a plurality of switched nodes and a microprocessor for executing a routing and scheduling algorithm in order to route data between a plurality of computer devices connected at the edge of the switched nodes.
FIG. 3 shows a topology for the switched nodes of FIG. 2 as a two-dimensional switched fabric where each node comprises four bi-directional ports.

The switched node $10_i$ of FIG. 5 is intended for use in a switched fabric network, such as the switched fabric network 26 shown in FIG. 2. The switched fabric network 26 comprises a plurality of interconnected switched nodes 28 for routing data between a plurality of host initiators. The switched nodes 28 also serve as a network storage system for the switched fabric network 26. A microprocessor 30 within the switched fabric network 26 executes a routing and scheduling algorithm in order to route and schedule requests received from the host initiators, including requests to access the network storage system. The switched fabric network 26 further comprises data buffers $(32_0-32_N)$ for buffering data at the edge of the switched nodes 28.

The microprocessor 30 in the switched fabric network 26 of FIG. 2 executes a conventional routing algorithm for routing requests (messages) between the nodes within and at the edge of the switched nodes 28 (the storage system, host initiators, etc.). In one embodiment, a request consists of a packet having a packet header comprising routing data which identifies the destination node for the packet. The microprocessor 30 processes the packet header in order to route the packet through the switched nodes 28. A suitable routing algorithm implemented by the microprocessor 30 generates control data 34 for configuring the multi-port switches within the switched nodes 28. Any suitable routing algorithm may be implemented by the switched fabric network 26, and it may support Unicast, Multicast, or Broadcast delivery mechanisms. The routing decisions may be made centrally, at the source, distributed, or multiphase, implemented using a lookup table or using a finite-state machine. Further, the routing algorithm may be deterministic or adaptive. A discussion of various routing algorithms which may be employed in the embodiments of the present invention is provided by Jose Duato et al. in the text book "Interconnection Networks, an Engineering Approach", IEEE Computer Society, 1997.

Figure 4:
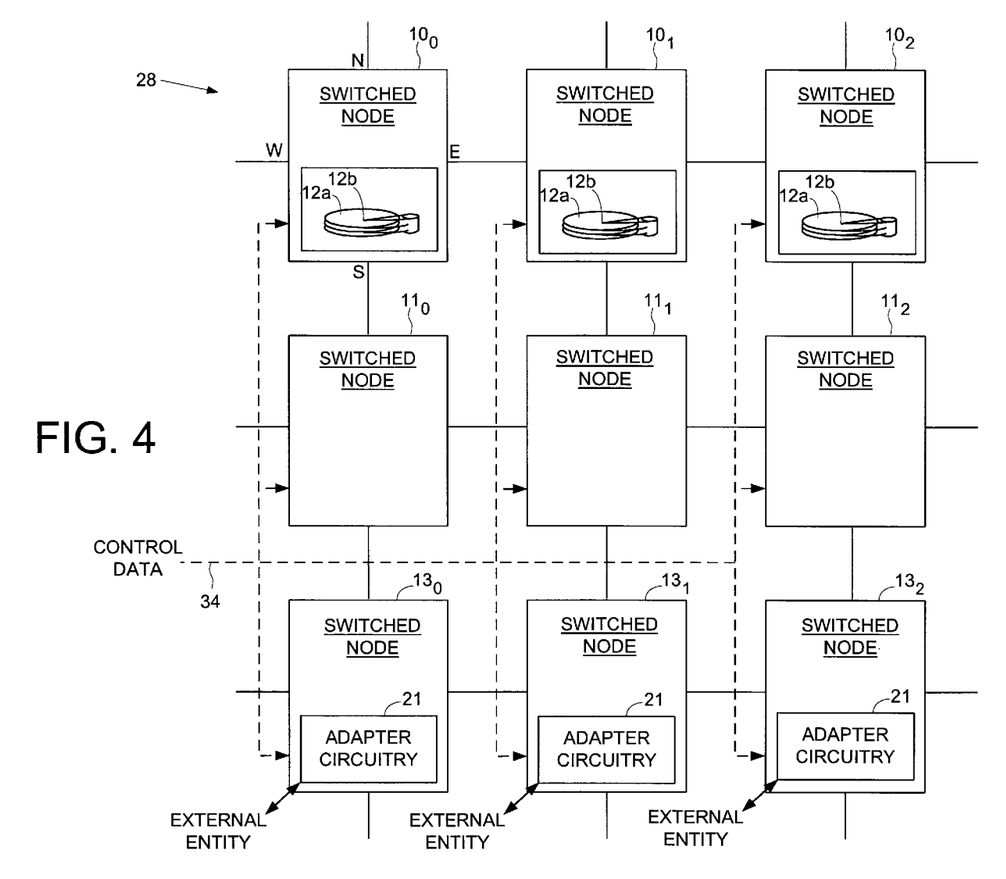
FIG. 4 shows an embodiment of the present invention wherein a selected number of the switched nodes of FIG. 3 comprise a disk and a head for implementing a parallel access, non-blocking network storage system.

The routing algorithm is implemented a layer "above" the switching layer, and thus the routing algorithm may be compatible with various different switching algorithms, for example, Virtual Cut-Through Switching, Wormhole Switching, and Mad Postman Switching. The switching layer is defined by the interconnection of the switched nodes 28, where FIG. 3 illustrates an example topology for the switched nodes 28 as a two dimensional switched fabric where each node comprises four bi-directional ports (North, South, East and West). This multi-dimensional aspect of a switched fabric provides a parallel access, non-blocking network storage system when a disk 12a and a head 12b are integrated into a selected number of the switched nodes of the switched fabric as illustrated in FIG. 4. Other topologies may be employed in the present invention by decreasing or increasing the number of bi-directional ports per node. Various topologies and switching algorithms which may be employed in the embodiments of the present invention are discussed in the aforementioned text book by Jose Duato et al. In the embodiment shown in FIG. 4, the switched nodes 28 constituting the switched fabric may or may not comprise a disk 12a and a head 12b. In addition, a select number of the switched nodes 28 comprise adapter circuitry 21 for connecting to an external entity (e.g., a host initiator in FIG. 2). In the example of FIG. 4, switched nodes $10_0-10_2$ comprise a disk 12a and a head 12b as shown in FIG. 5, switched nodes $11_0-11_2$ comprise the circuitry shown in FIG. 5 without the disk 12a and head 12b, and switched nodes $13_0-13_2$ comprise adapter circuitry 21 for connecting to an external entity and may or may not comprise a disk 12a and head 12b. In another embodiment, a selected number of the switched nodes (e.g., $11_0-11_2$) comprise a microprocessor for implementing a distributed routing algorithm.

In one embodiment, scheduling data (e.g., the radial position of the head 12b) is received automatically from each switched node $10_0-10_2$ so as to make more efficient use of the microprocessor 30 bandwidth. The microprocessor 30 processes the scheduling data to schedule access to each disk 12a. For example, in one embodiment the switched fabric network 26 implements a network file system for the host initiators. The network file system may support "data mirroring" and/or "data striping" using a plurality of the disks 12a to enhance performance in terms of throughput and data security. When a host initiator sends a request to the switched fabric network 26 to access a file (read or write), the microprocessor 30 selects the most appropriate disk or disks 12a to service the request based on the scheduling data received from each switched node $10_0-10_2$.

The microprocessor 30 may implement any suitable scheduling algorithm. For example, the microprocessor 30 may implement an elevator or SCAN algorithm wherein the head 12b sweeps the entire surface of the disk 12a, visiting the outermost cylinders before reversing direction and sweeping back to the inner most cylinders. Another suitable scheduling algorithm is the circular SCAN algorithm wherein requests are only satisfied when the head 12b is traveling in one direction across the surface of the disk 12a. The microprocessor 30 will evaluate the scheduling data to prioritize the requests received from the host initiators and to select the most appropriate disk or disks 12a to service each request.

In the embodiment of FIG. 5, the routing circuitry comprises a routing table 36 and a scheduling facility 38A–38D. Data packets received from the input ports 16A–16D are buffered in FIFO buffers 40A–40D. The routing table 36 is configured by the control data 34 generated by the microprocessor 30 of FIG. 2. The routing table 36 generates control signals 42A–42D which configure multiplexers 44A–44D in order to route the data packets to appropriate data buffers 22A–22D associated with the output ports 18A–18D. In this manner, the data packets cross the switched node $10_i$ immediately except for the delay of the FIFO buffer 40A–40D. The FIFO buffers 40A–40D provide buffering of input data in the event that the target data buffer 22 is full or busy receiving data from another of the input ports.

The data packets may also be routed to an input port 46 associated with disk 12a and head 12b and processed by the interface circuitry 20 to write the data packets onto the disk 12a. Data read from the disk 12a is also processed by the interface circuitry 20 and transmitted via output port 48 to the appropriate data buffer 22A–22D.

The scheduling facility 38A–38D schedules the time when the data packets are to be transferred from the data buffers 22A–22D to the output ports 18A–18D. In one embodiment, the timing information for the packets are stored in the packet headers and processed by the scheduling facility 38A–38D. In one embodiment, the timing information implements an isochronous communication protocol such as disclosed in the in Texas Instruments' TSB12LV41 A link-layer controller (LLC) which supports the IEEE 1394 specification for high-performance serial bus with automatic generation of the common isochronous packet headers and time stamping as required by the IEC 61883 standard.

In one embodiment, the data buffers 22A–22D comprise a plurality of virtual lanes where each virtual lane is assigned a predetermined priority level. The scheduling facility 38A–38D schedules the time sensitive data packets according to the timing information by queuing the time sensitive data packets in the appropriate virtual lanes. For example, data packets with shorter transmission deadlines are queued in higher priority virtual lanes, whereas data packets with longer transmission deadlines are queued in lower priority virtual lanes.

In one embodiment, the interface circuitry 20 processes the network packets received from the input port 46 directly in order to write the data to the disk 12a. This eliminates the overhead and expense associated with the prior art adapter circuitry which converts the network packets into logical block addresses before being converted by a conventional disk controller into physical block addresses for writing onto the disk 12a. Similarly, the interface circuitry 20 converts data read from the disk 12a via physical block addresses directly into network packet data transmitted to a host initiator via a selected output port 18A–18D.

Figure 6:
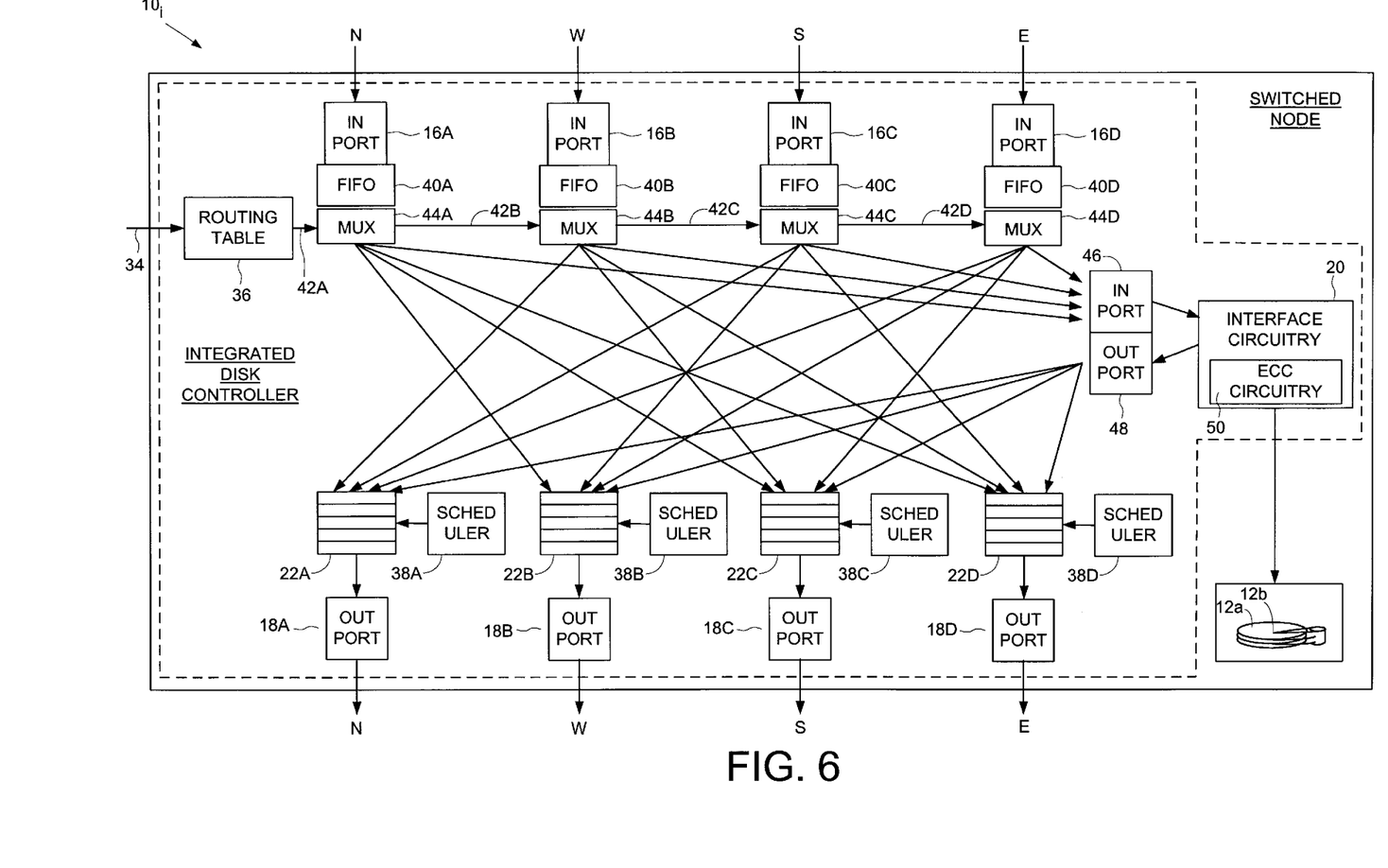
FIG. 6 shows a switched node according to an embodiment of the present invention wherein the interface circuitry comprises error correction code (ECC) circuitry.

FIG. 6 shows a switched node $10_i$ according to an embodiment of the present invention where the interface circuitry 20 comprises error correction code (ECC) circuitry 50 for use in detecting and correcting errors in data recorded on the disk 12a. When a network packet is received from the routing circuitry 24 for storage on the disk 12a, the ECC circuitry 50 encodes redundancy symbols which are stored together with the network packet data on the disk 12a. Any suitable ECC code may be employed in the present invention, such as the well known Reed-Solomon ECC code. When data is read from the disk 12a, the ECC redundancy symbols are used to detect and correct errors induced by the recording process.

Figure 7:
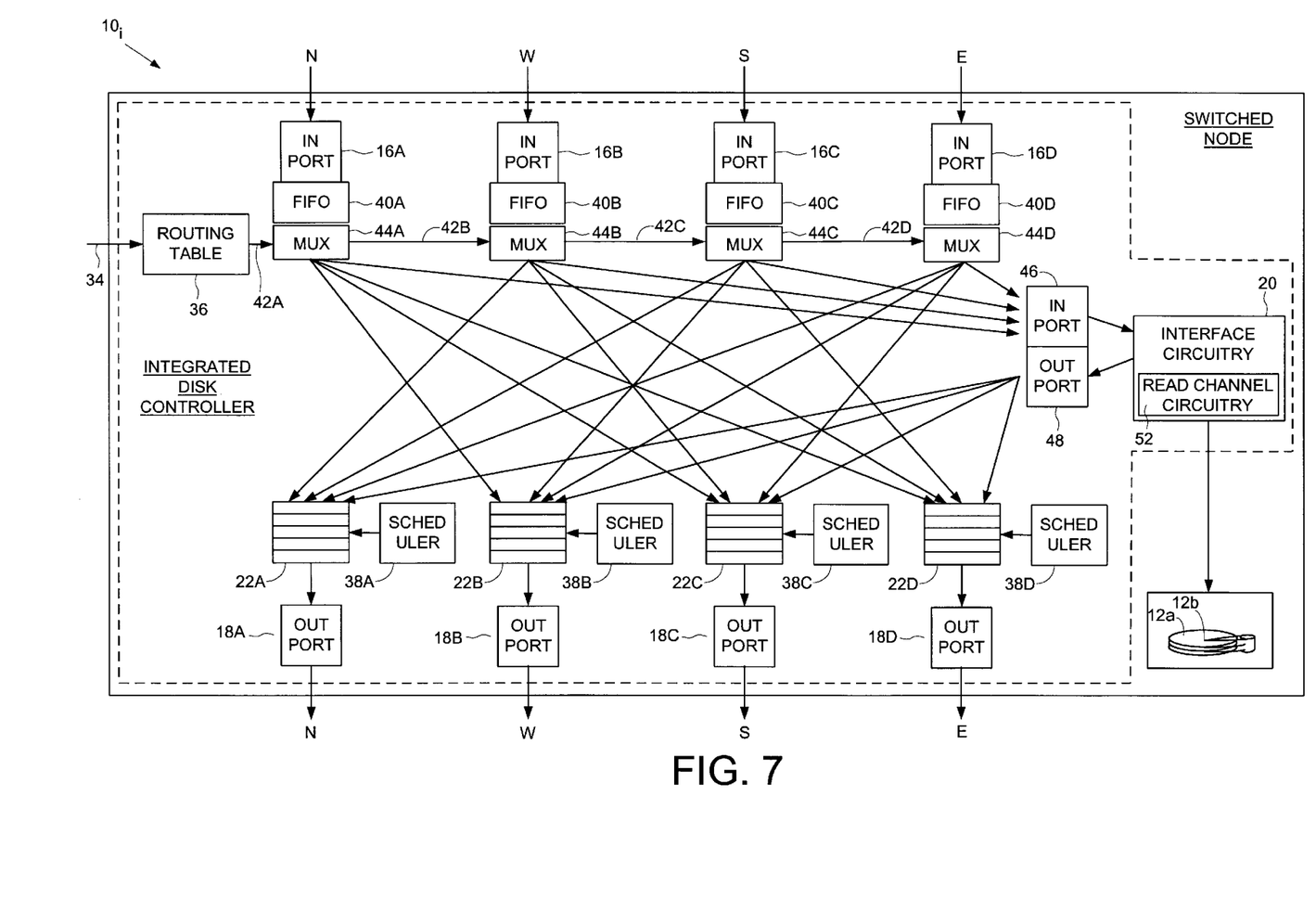
FIG. 7 shows a switched node according to an embodiment of the present invention wherein the interface circuitry comprises read channel circuitry.

FIG. 7 shows a switched node $10_i$ according to another embodiment of the present invention where the interface circuitry 20 comprises read channel circuitry 52 for use in writing data to the disk 12a and for reading data from the disk 12a using signal processing circuitry such as the well known Partial Response Maximum Likelihood (PRML) read channel circuitry.

In another embodiment of the present invention, the bi-directional ports (input ports 16A–16D and output ports 18A–18D) are dynamically configurable to connect to bi-directional ports of other switched nodes. This allows for a programmable topology to the switched nodes 28 of FIG. 2 rather than a static topology. Each switched node becomes a building block for configuring any number of different topologies depending on the particular application. In one embodiment, a select number of the bi-directional ports of one of the switched storage nodes are connected to bi-directional ports of other switched nodes, and the remaining bi-directional ports are left unconnected.

In yet another embodiment, the switched node further comprises a self-discovery facility for use in discovering the topology of the switched fabric network. For example, address probes may be transmitted through the nodes of the switched fabric in order to dynamically configure an address for each node. An initiator node in the switched fabric begins the self-discovery process by generating an address probe transmitted through each of the bi-directional ports. If the address probe reaches an adjacent node, the address probe is forwarded to the next node through a port corresponding to a particular dimension. The address probe terminates, and the topology of the switched fabric is discovered, when the address probe reaches a previously visited node, or when the address probe reaches a node with an unconnected port.

We claim:

1. A switched node for use in a switched fabric network, the switched node comprising:

(a) a disk and a head actuated over the disk;

(b) an integrated disk controller comprising:
more than two bi-directional ports for simultaneously transmitting data in multiple directions through the switched fabric network, each port comprising an input port and an output port;
interface circuitry for interfacing with the head;
a data buffer for storing data received from the input ports and data received from the head via the interface circuitry; and
routing circuitry responsive to header data received from the input ports and header data received from the interface circuitry,
wherein the interface circuitry processes data received from the data buffer in order to store the data on the disk without mapping logical block addresses into physical block addresses.

2. The switched node of claim 1, wherein the interface circuitry comprises error correction code (ECC) circuitry for encoding data received from the data buffer into ECC codewords written to the disk during a write operation, and for decoding the codewords read from the disk during a read operation.

3. The switched node of claim 1, wherein the interface circuitry comprises read channel circuitry for writing data received from the data buffer to the disk during a write operation, and for reading data from the disk during a read operation.

4. The switched node of claim 1, wherein the bi-directional ports are dynamically configurable to connect to bi-directional ports of other switched nodes.

5. The switched node of claim 4, wherein:

(a) the switched fabric network comprises a selected topology; and (b) further comprising a self-discovery facility for use in discovering the topology of the switched fabric network.

6. A switched fabric network comprising:
a plurality of interconnected switched nodes, each switched node comprising:
  a disk and a head actuated over the disk; and
  an integrated disk controller comprising:
    more than two bi-directional ports for simultaneously transmitting data in multiple directions through the switched fabric network, each port comprising an input port and an output port;
    interface circuitry for interfacing with the head;
    a data buffer for storing data received from the input ports and data received from the head via the interface circuitry; and
    routing circuitry responsive to header data received from the input ports and header data received from the interface circuitry,
    wherein the interface circuitry processes data received from the data buffer in order to store the data on the disk without mapping logical block addresses into physical block addresses.

7. The switched fabric network of claim 6, wherein the interface circuitry comprises error correction code (ECC) circuitry for encoding data received from the data buffer into ECC codewords written to the disk during a write operation, and for decoding the codewords read from the disk during a read operation.

8. The switched fabric network of claim 6, wherein the interface circuitry comprises read channel circuitry for writing data received from the data buffer to the disk during a write operation, and for reading data from the disk during a read operation.

9. The switched fabric network of claim 6, wherein a select number of the bi-directional ports of one of the switched nodes are connected to bi-directional ports of other switched nodes, and the remaining bi-directional ports are unconnected.

10. The switched fabric network of claim 9, wherein
  (a) the switched fabric network comprises a selected topology; and
  (b) each switched node further comprising a self-discovery facility for use in discovering the topology of the switched fabric network.

* * * * *